A. JUTILA.
VEHICLE WHEEL.
APPLICATION FILED MAY 28, 1910.
1,000,013.
Patented Aug. 8, 1911.
2 SHEETS—SHEET 1.
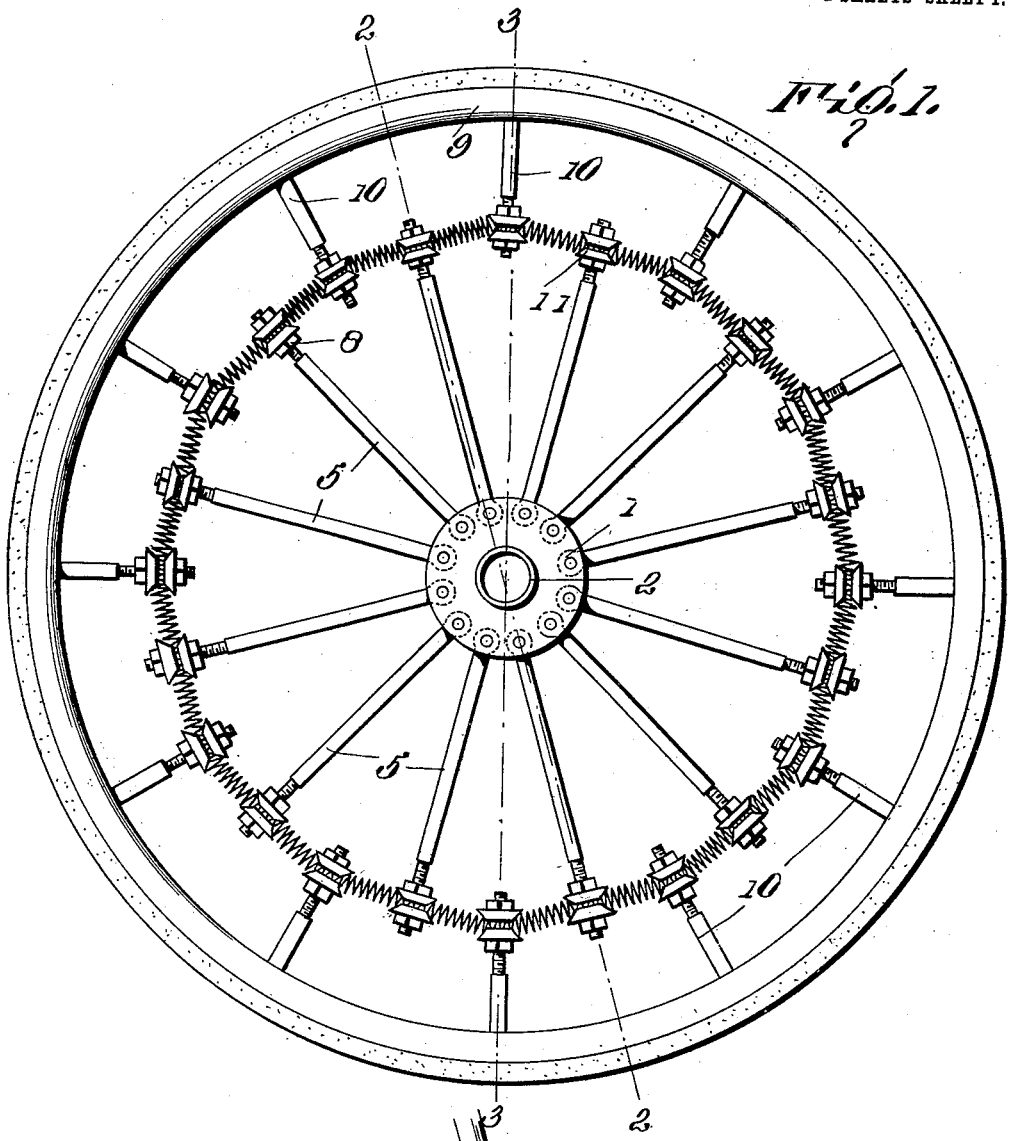
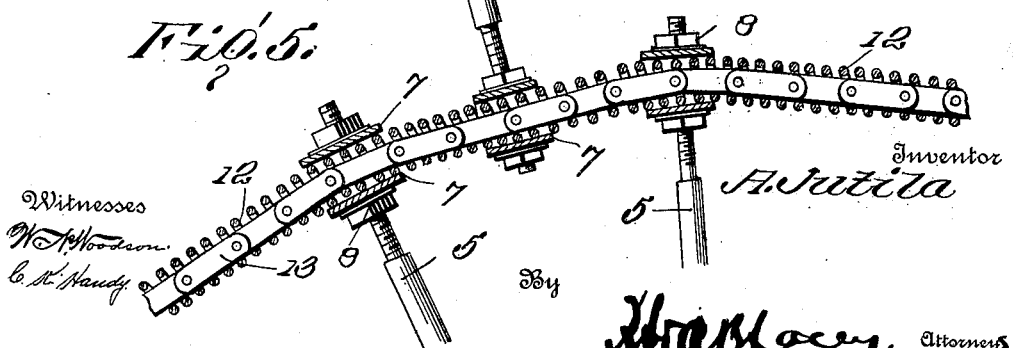
Witnesses
Inventor
A. Jutila
By
Attorneys

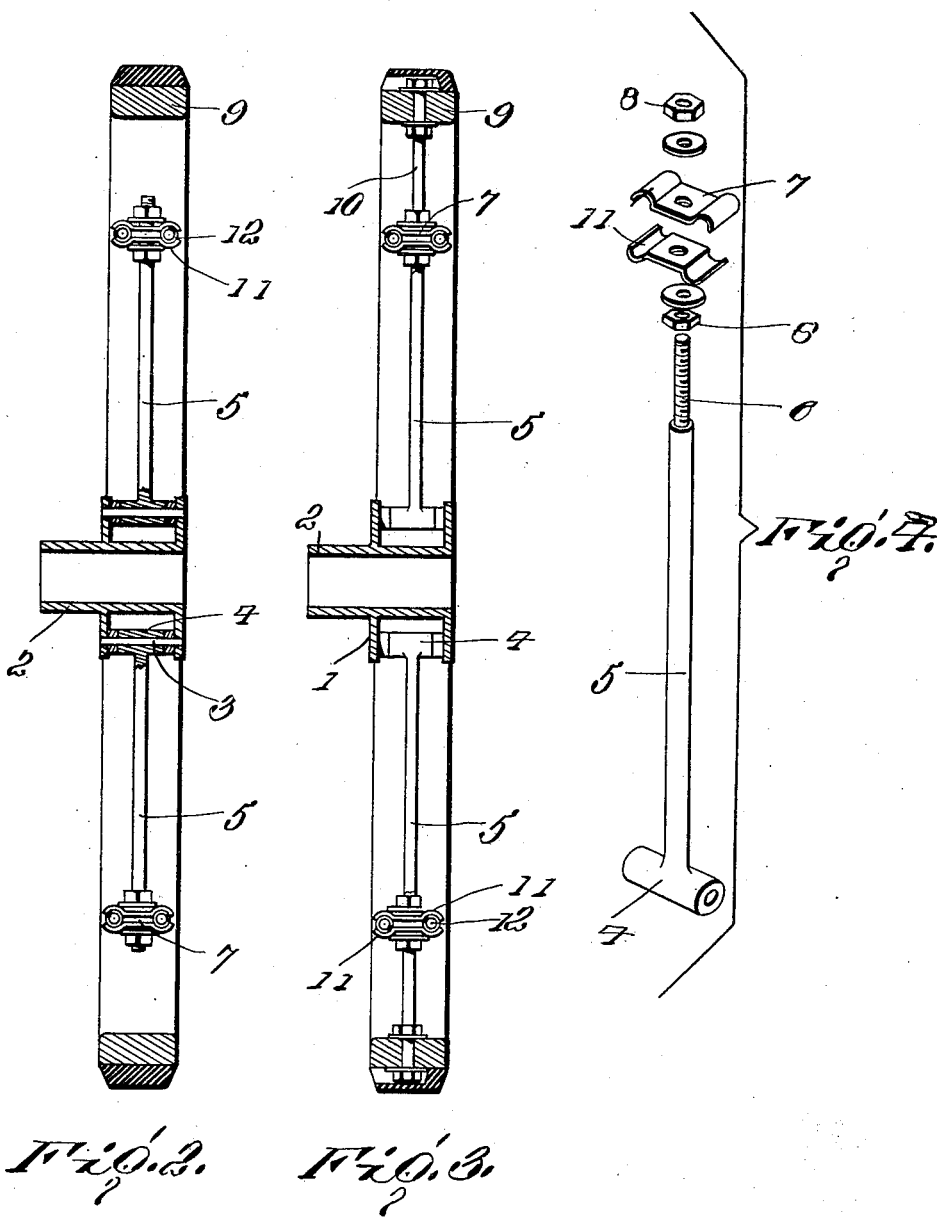

UNITED STATES PATENT OFFICE.

ARTTURI JUTILA, OF KINNEY, MINNESOTA.

VEHICLE-WHEEL.

1,000,013.  Specification of Letters Patent.  Patented Aug. 8, 1911.

Application filed May 28, 1910. Serial No. 563,994.

*To all whom it may concern:*

Be it known that I, ARTTURI JUTILA, a Finlander, residing at Kinney, in the county of St. Louis and State of Minnesota, have invented certain new and useful Improvements in Vehicle-Wheels, of which the following is a specification.

This invention comprehends certain new and useful improvements in resilient wheels for automobiles or other vehicles, and the invention has for its primary object a simple, durable and efficient construction of resilient wheel which will secure the desired resiliency without the use of rubber, thereby avoiding the disadvantages and objectionable features that are incidental to the use of the ordinary solid or pneumatic rubber tires. And the invention has for a further object a device of this character which may be easily manufactured and the parts readily assembled and which will be efficient in operation in avoiding any transmission of shocks of any character to the hub of the wheel and thence to the body of the vehicle, the device thereby promoting the comfort of the riders.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of a vehicle wheel constructed in accordance with my invention; Fig. 2 is a diagrammatic section thereof on the line 2—2 of Fig. 1; Fig. 3 is a similar view on the line 3—3 of Fig. 1; Fig. 4 is a detail perspective view of one of the spokes and its related parts; and, Fig. 5 is an enlarged longitudinal sectional view of one embodiment of my invention.

Corresponding and like parts are referred to in the following description and indicated in all the views of the drawings by the same reference characters.

Referring to the drawing, the numeral 1 designates the hub of my improved vehicle wheel, the same embodying two laterally spaced disks which are secured in any desired way to the bearing sleeve 2 by which the wheel is designed to fit over an axle spindle. The hub 1 also embodies any desired number of transversely extending pins 3 upon which the transversely apertured and laterally enlarged inner ends 4 of spoke sections 5 are adapted to slip, whereby to effect a jointed or pivotal connection between the hub and the inner ends of the spokes. The spoke sections are preferably tubular, and in their outer ends threaded stems 6 are fitted, said stems passing freely through clamping plates 7 and being secured to the clamping plates by means of inner and outer jam nuts 8. The spokes terminate at their outer ends short of the felly 9 of the wheel, and the latter has secured therein by jam nuts or the like, as shown in Fig. 3, a plurality of radially disposed inwardly extending threaded rods 10, the inner ends of which pass through corresponding clamping plates that are secured on the rods by jam nuts, as shown. The rods 10 alternate with the spokes and stems, in preferably equidistant relation to each other. Each pair of clamp plates 7 is formed at opposite sides with curved lugs 11 forming sockets through which preferably steel springs 12 extend in a circumferential direction, these springs being coiled or helical springs in the present instance and being substantially endless. Preferably, the springs extend straight from one pair of clamps to the next. If desired, chains 13 may be threaded through the springs 12 so as to hold the parts together should they or any of the other parts break, as best illustrated in Fig. 5. The felly 9 may be encircled by a tire of any desired character, either metal or rubber, although it is to be understood that I do not depend at all upon the rubber to impart the necessary resiliency to the wheel.

From the foregoing description in connection with the accompanying drawings, the operation of my improved resilient wheel will be apparent. In the practical use of the device, any shock or stress which is imposed upon the tread surface of the felly at any point will be taken up and absorbed by the springs 12 which hold the felly in a distinct and suspended relation with the hub 1, and consequently the shock will not be transmitted to the hub and thence to the body portion of the vehicle equipped with a wheel of this character, but will be practically dissipated. Even if several of the springs should break at once, which is a very remote contingency, if the springs be made of the best steel and the other parts correspondingly formed of good materials, the chains 13 will hold the parts together and the vehicle used until a place of repair is reached.

Having thus described the invention, what is claimed as new is:

1. A resilient wheel of the character described, comprising a hub, spokes connected at their inner ends to said hub, the spokes being extensible, clamping plates secured to said spokes, a felly surrounding the spokes, rods secured to the felly and extending inwardly between the spokes, corresponding clamping plates mounted on said rods, the clamping plates being formed at opposite sides with sockets, and a pair of coiled springs extending circumferentially from one clamping plate to another and mounted within the sockets for the purpose specified.

2. A resilient wheel of the character described, comprising a hub, spokes pivotally connected at their inner ends to said hub, the other ends of the spokes being threaded, clamping plates adapted to be slipped over said threaded ends, nuts securing the clamp plates to said ends, a felly surrounding the spokes, but devoid of direct connection thereto, rods secured to the felly and extending inwardly between the spokes, said rods being threaded, corresponding clamps mounted on said rods and held thereon by nuts, the clamps being formed at opposite sides with sockets, and a pair of coil springs extending circumferentially from one pair of clamp plates to the other and mounted in the said sockets, for the purpose specified.

3. A resilient wheel of the character described, comprising a hub, spokes pivotally connected at their inner ends to said hub, the other ends of the spokes being threaded, clamping plates adapted to be slipped over said threaded ends, nuts securing the clamp plates to said ends, a felly surrounding the spokes, but devoid of direct connection thereto, rods secured to the felly and extending inwardly between the spokes, said rods being threaded, corresponding clamps mounted on said rods and held thereon by nuts, the clamps being formed at opposite sides with sockets, a pair of coil springs extending circumferentially from one pair of clamp plates to the other and mounted in the said sockets, and chains threaded through said springs.

In testimony whereof, I affix my signature in presence of two witnesses.

ARTTURI JUTILA. [L. S.]

Witnesses:
OSCAR JOHNSTON,
JOHN ERICKSON.